United States Patent
Itakura et al.

(10) Patent No.: US 10,011,890 B2
(45) Date of Patent: Jul. 3, 2018

(54) SODIUM TUNGSTATE PRODUCTION METHOD

(71) Applicant: A.L.M.T. Corp., Tokyo (JP)

(72) Inventors: Takeshi Itakura, Tokyo (JP); Akihiko Ikegaya, Tokyo (JP); Yoshiharu Yamamoto, Tokyo (JP)

(73) Assignee: A.L.M.T. Corp., Tokyo (JP)

( * ) Notice: Subject to any disclaimer, the term of this patent is extended or adjusted under 35 U.S.C. 154(b) by 452 days.

(21) Appl. No.: 14/775,824

(22) PCT Filed: Mar. 6, 2014

(86) PCT No.: PCT/JP2014/055808
§ 371 (c)(1),
(2) Date: Sep. 14, 2015

(87) PCT Pub. No.: WO2014/142003
PCT Pub. Date: Sep. 18, 2014

(65) Prior Publication Data
US 2016/0024615 A1   Jan. 28, 2016

(30) Foreign Application Priority Data
Mar. 15, 2013   (JP) ................................. 2013-052810

(51) Int. Cl.
  *C22B 34/36*   (2006.01)
  *C01G 41/00*   (2006.01)
  *C22B 7/00*   (2006.01)

(52) U.S. Cl.
  CPC ............. *C22B 34/36* (2013.01); *C01G 41/00* (2013.01); *C22B 7/00* (2013.01); *C22B 7/001* (2013.01); *Y02P 10/214* (2015.11); *Y02P 10/234* (2015.11)

(58) Field of Classification Search
  CPC ........... C01G 41/00; C22B 7/00; C22B 7/001; C22B 34/36; Y02P 10/214; Y02P 10/234
  See application file for complete search history.

(56) References Cited

U.S. PATENT DOCUMENTS 5,993,756 A * 11/1999 Lohse ................... C01G 41/00
                                                              423/1
2009/0255372 A1   10/2009 Olbrich et al.

FOREIGN PATENT DOCUMENTS

| JP | 11-505801 A | 5/1999 |
| JP | 2009-541596 A | 11/2009 |
| WO | 2010/104009 A1 | 9/2010 |

OTHER PUBLICATIONS

EP1175948, Kobayashi et al, 2002, see attached filed.*
"Eniviornmental assessment of electrochemical glazing production", Syrrakou et al, 2005, Solar Energy Materials and Solar cells, vol. 85, issue 2 pp. 205-240.*
Kohei Kawakita et al., "Recovery of Tungsten etc. from Discarded Carbide Tools", The Resources Processing Society of Japan, Proceedings of the Symposium "Separation and Recovery Technique for Various Rare Metals", Sep. 15, 2008, pp. 19-23, vol. 17.

(Continued)

*Primary Examiner* — Melvin C. Mayes
*Assistant Examiner* — Smita S Patel
(74) *Attorney, Agent, or Firm* — Sughrue Mion, PLLC

(57) ABSTRACT

A method of producing sodium tungstate of this invention including allowing cemented carbide scrap containing tungsten to react with a molten salt containing sodium sulfate and having added thereto a metal oxide, to thereby obtain sodium tungstate.

19 Claims, 4 Drawing Sheets

(56) References Cited

OTHER PUBLICATIONS

Yasuhiko Tenmaya, "Recovery of Tungsten etc. from Discarded Carbide Tools", Development Project of High-Efficiency Recovery System for Rare Metals, Mineral Resources Report, Japan Oil, Gas and Metals National Corporation, Nov. 2008, pp. 407-413, vol. 38, No. 4.
International Search Report for PCT/JP2014/055808 dated Jun. 10, 2014.

* cited by examiner

SODIUM TUNGSTATE PRODUCTION METHOD

CROSS REFERENCE TO RELATED APPLICATIONS

This application is a National Stage of International Application No. PCT/JP2014/055808 filed Mar. 6, 2014, claiming priority based on Japanese Patent Application No. 2013-052810 filed Mar. 15, 2013, the contents of all of which are incorporated herein by reference in their entirety.

TECHNICAL FIELD

This invention relates to a method of producing sodium tungstate.

BACKGROUND ART

A cemented carbide alloy, which contains tungsten carbide as a main component and cobalt, nickel, or the like as a binder metal and which has added thereto a carbide of titanium, tantalum, chromium, or the like for improving performance, has been widely used in tools for metal processing or the like by virtue of its excellent hardness and abrasion resistance.

In the tools using such cemented carbide alloy, a tool which cannot be used any more due to a defect, abrasion, or the like during use or a defective part thereof is discarded as scrap called hard scrap.

Further, part of cemented carbide alloy powder generated during manufacturing of a cemented carbide tool, ground dust generated during processing of the cemented carbide tool with a grinding stone, and the like are discarded as scrap called soft scrap.

It should be noted that, in the following description, the "cemented carbide scrap" refers to used scrap of an alloy containing 50 wt % or more of tungsten carbide, and cobalt or nickel as a binder phase.

The hard scrap and soft scrap each contain a large amount of tungsten, which is a rare metal. 60% or more of tungsten resources have been used in the cemented carbide tools. Further, the prices of ammonium paratungstate (APT) and tungsten oxide serving as intermediate raw materials for a tungsten material have continued to rise in recent years, and there is a demand for establishment of a recycling technology for tungsten contained in the cemented carbide tools.

For example, in Non Patent Document 1, there is disclosed a method of recycling a cemented carbide tool, which involves recycling tungsten carbide from a used cemented carbide tool or the like. Specifically, the method of recycling a cemented carbide tool of Non Patent Document 1 is performed as described below. First, hard scrap or soft scrap of a cemented carbide tool is allowed to react with a molten salt of sodium nitrate (molten salt dissolution reaction), and the resultant is dissolved in water to produce an aqueous solution of sodium tungstate. Next, an aqueous solution of ammonium tungstate is produced from the aqueous solution of sodium tungstate by an ion exchange method using an ion exchange resin, and ammonium paratungstate (APT) is crystallized out from the aqueous solution of ammonium tungstate. After that, ammonium paratungstate thus crystallized out is subjected to calcination, reduction, and carbonization, with the result that tungsten carbide can be obtained.

On the other hand, in Patent Document 1, there is disclosed treatment of reducing hexavalent chromium to be generated during a reaction between a molten salt of sodium nitrate and cemented carbide scrap to water-insoluble trivalent chromium having low harmfulness. There is also disclosed a method of performing the treatment semi-continuously while controlling the reaction efficiently (Patent Document 1).

Further, in Patent Document 2, there is proposed the use of a molten salt containing 60 wt % to 90 wt % of sodium hydroxide and 10 wt % to 40 wt % of sodium sulfate in production of sodium tungstate by oxidation of scrap of a hard alloy and/or scrap of a heavy metal in a molten salt bath (Patent Document 2). There is also proposed that a reaction between the scrap and the molten salt is performed in a rotary kiln, which is operated batch-wise and can be heated directly.

PRIOR ART DOCUMENTS

Patent Document

Patent Document 1: WO 2010/104009 A1
Patent Document 2: JP-A-H11-505801

Non Patent Document

Non Patent Document 1: Yasuhiko Tenmaya, Development Project for Highly Efficient Recovery System for Rare Metal etc. "Recovery of Tungsten etc. from Discarded Cemented Carbide Tools," Mineral Resources Report, Japan Oil, Gas and Metals National Corporation, Vol. 38, No. 4, November, 2008, pp. 407-413

DISCLOSURE OF THE INVENTION

Problem to be Solved by the Invention

However, the technologies disclosed in the above-mentioned documents have the following problems.

First, in the case of using sodium nitrate as a molten salt as disclosed in Non Patent Document 1 and Patent Document 1, there are the following problems.

(1) The oxidation power of sodium nitrate is very strong as compared to sodium sulfate, and hence the reaction with the cemented carbide scrap proceeds very vigorously and is difficult to control, with the result that a facility becomes complicated.

(2) The oxidation power of sodium nitrate is very strong as compared to sodium sulfate, and hence chromium added to the cemented carbide scrap is oxidized up to a valence of 6, which is the highest oxidation number. Hexavalent chromium is a harmful compound, and thus the reduction treatment as disclosed in Patent Document 1 is required for removing hexavalent chromium in an aqueous solution.

(3) The melting point of sodium nitrate is as low as 308° C. and the decomposition point thereof is 380° C., and hence in a temperature range in which sodium nitrate can react with the cemented carbide scrap efficiently, the self-decomposition of sodium nitrate occurs. Therefore, it may be difficult to allow the cemented carbide scrap to react with loaded sodium nitrate efficiently.

(4) Sodium nitrate is expensive as compared to sodium sulfate, which leads to an increase in cost.

(5) Some cermets contain only about 20 wt % of tungsten carbide, and in such cases, a component which does not react by molten salt dissolution treatment with sodium nitrate may be contained in the cermets. Thus, there is a problem in that an unreacted material remains in a reaction vessel.

Meanwhile, in the case of using sodium sulfate as a molten salt as in Patent Document 2, the oxidation power of sodium sulfate is low as compared to sodium nitrate, and hence there are advantages in that: it is easy to control the reaction; hexavalent chromium is not generated; cost is low; and the like. However, there are the following problems.

(1) Sodium sulfate contains sulfur, and hence a harmful sulfur oxide gas is generated along with the molten salt dissolution reaction, and treatment of detoxifying the sulfur oxide gas is required. In particular, air blowing is performed in order to accelerate the oxidation reaction in Patent Document 2, and hence the amount of an exhaust gas containing the above-mentioned harmful gas increases, with the result that a burden on an exhaust gas treatment facility is increased.

(2) Sodium sulfate contains sulfur, and hence a water-soluble sulfide, such as sodium sulfide, is generated as a reaction byproduct in the molten salt dissolution treatment. In order to refine tungsten, it is necessary to dissolve produced sodium tungstate in water. However, the water-soluble sulfide becomes sulfide ions in an aqueous solution and is bound to hydrogen to generate a hydrogen sulfide gas. The hydrogen sulfide gas is harmful, and hence exhaust gas treatment, sealing of a tank, and the like are required. Further, hydrogen sulfide is listed in "Investigation item list as measure toward water environment conservation" specified by Ministry of the Environment, and it is necessary to minimize the dissolution of hydrogen sulfide in water. Further, a sulfur precipitate is deposited in a subsequent step, and the purity of APT, which is an intermediate raw material for a tungsten material, decreases.

(3) In Patent Document 2, sodium hydroxide occupies 60% to 90% of the molten salt. However, sodium hydroxide is expensive, as compared to sodium sulfate, which leads to an increase in cost.

As described above, the related-art methods of producing sodium tungstate have problems both in the case of using sodium nitrate and in the case of using sodium sulfate, and in particular, as the case now stands, there is no production method capable of suppressing the generation of the above-mentioned harmful byproducts.

This invention has been made in view of the above-mentioned problems, and it is an object of this invention to provide a method of producing sodium tungstate capable of allowing cemented carbide scrap to react with a molten salt more efficiently than in the related art and suppressing the generation of harmful byproducts.

Means to Solve the Problem

In order to solve the above-mentioned problems, the inventors of this invention have investigated a method of suppressing the generation of a byproduct derived from sulfur, which is generated in the case of using sodium sulfate as a molten salt.

As a result, the inventors of this invention have found that when a metal oxide is added to a molten salt, a water-soluble sulfide contained in the molten salt is decomposed and sulfur can be immobilized as a water-insoluble transition metal sulfide salt, and the generation of the water-soluble sulfide, which generates a harmful hydrogen sulfide gas, can be suppressed while the generation of hexavalent chromium is prevented. Thus, the inventors of this invention have achieved this invention.

According to one aspect of the present invention, there is provided a method of producing sodium tungstate, the method comprising allowing cemented carbide scrap containing tungsten to react with a molten salt containing sodium sulfate and having added thereto a metal oxide, to thereby obtain sodium tungstate.

Effect of the Invention

According to the embodiment of this invention, the method of producing sodium tungstate capable of allowing cemented carbide scrap to react with a molten salt more efficiently than in the related art and suppressing the generation of harmful byproducts can be provided.

MODES FOR EMBODYING THE INVENTION

Figure 1:
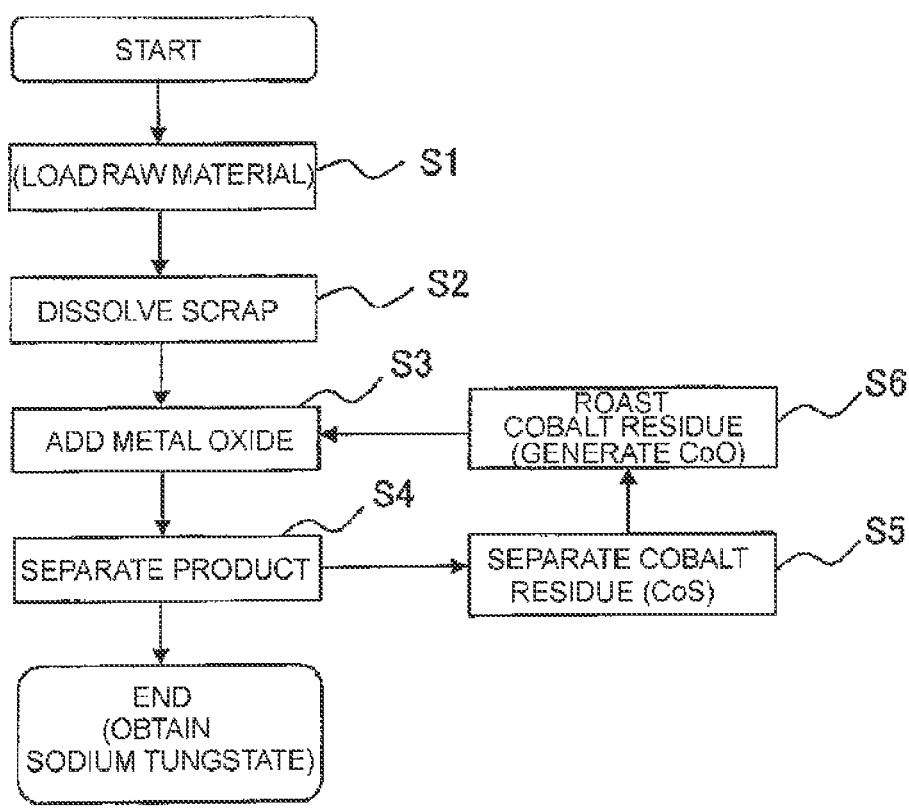
FIG. 1 is a flowchart for illustrating a method of producing sodium tungstate of this invention.

Preferred embodiments of this invention are described in detail below with reference to the drawings.
<Principle of this Invention>
First, the principle of this invention is briefly described.
As described above, a method of producing sodium tungstate of this invention includes allowing cemented carbide scrap containing tungsten to react with a molten salt containing sodium sulfate and having added thereto a metal oxide, to thereby obtain sodium tungstate.

First, sodium sulfate has advantages in that sodium sulfate is inexpensive, and gently reacts with WC in the cemented carbide scrap as compared to sodium nitrate. However, in that course, sodium sulfate has a problem in that a water-soluble sulfide typified by sodium sulfide is generated through the reaction represented by Equation 1.

$$3Na_2SO_4 + 2WC \rightarrow Na_2S + 2Na_2WO_4 + 2CO\uparrow 2SO\uparrow \quad \text{(Equation 1)}$$

The water-soluble sulfide is dissolved in an aqueous solution together with sodium tungstate to generate sulfide ions. The aqueous solution of sodium tungstate is converted into ammonium tungstate by a known method, such as ion exchange or solvent extraction. In this step, the pH of the aqueous solution is often lowered, and at this time, the sulfide ions are discharged as hydrogen sulfide gas through the reaction represented by Equation 2. The hydrogen sulfide gas is harmful, and hence in order to remove the hydrogen sulfide gas, it is necessary to remove the hydrogen sulfide gas by a method using a scrubber or the like and immobilize the removed hydrogen sulfide gas.

$$Na_2S + H_2SO_4 \rightarrow Na_2SO_4 + H_2S\uparrow \quad \text{(Equation 2)}$$

Further, in the case where the aqueous solution of sodium tungstate contains sulfide ions in a concentration of 0.2% or more with respect to tungsten, the sulfide ions are not removed completely by the above-mentioned treatment and remain in the aqueous solution. In the case where the concentration of the sulfide ions in the aqueous solution is high, a sulfur precipitate is deposited during ion exchange treatment or solvent extraction treatment in the subsequent step. Although the reaction between tungsten carbide and sodium sulfate is as represented by Equation 1, it is known that an actual reaction is more complicated, and a sulfide such as $Na_2S_2$ is also generated simultaneously. It is considered that such compound gradually causes the deposition of the sulfur precipitate through the reaction represented by Equation 3 when the pH of the aqueous solution is lowered. As a result, sulfur is mixed into ammonium paratungstate (APT), which is an intermediate raw material for a tungsten material, and the purity of APT is significantly degraded.

$$Na_2S_2 \rightarrow Na_2S + S\downarrow \quad \text{(Equation 3)}$$

For the above-mentioned reasons, when the aqueous solution of sodium tungstate is obtained, it is necessary to suppress the concentration of the sulfide ions in the aqueous solution to 0.2% or less in terms of a ratio to tungsten in the aqueous solution. Thus, in this invention, a metal oxide is added to the molten salt.

When a metal oxide is added to the molten salt, the water-soluble sulfide contained in the molten salt is decomposed through the reaction represented by Equation 4, and sulfur can be immobilized as a water-insoluble sulfide metal salt. That is, when the reactions represented by Equation 1 and Equation 4 are allowed to occur simultaneously, the generation of the water-soluble sulfide, which generates a harmful hydrogen sulfide gas, can be suppressed while the generation of hexavalent chromium is prevented as described later.

$$Na_2S + MO \rightarrow Na_2O + MS \quad \text{(Equation 4, MO: metal oxide)}$$

<Production Method>

Next, a specific method of producing sodium tungstate based on the above-mentioned principle is described with reference to FIG. 1.

(Loading of Raw Material)

First, the cemented carbide scrap serving as a raw material for sodium tungstate and a raw material for the molten salt containing sodium sulfate are prepared and loaded into a melting furnace (S1 of FIG. 1)

As described above, the cemented carbide scrap is used scrap of an alloy containing 50 wt % or more of tungsten carbide, and cobalt and/or nickel as a binder phase. It should be noted that, even when the above-mentioned cermet is mixed in the cemented carbide scrap, a problem of an unreacted material remaining in a reaction vessel does not arise.

There is no limitation on the shape of the scrap and particles, and it is not necessarily required to mix the scrap with the raw material for the molten salt at the time of loading.

As the raw material for the molten salt, sodium sulfate is used as described above. Granular sodium sulfate may be used at the time of loading.

The amount of sodium sulfate is preferably 70 wt % or more and 150 wt % or less, more preferably 70 wt % or more and 100 wt % or less with respect to the weight of the cemented carbide scrap to be allowed to react.

The reason for the foregoing is that, when the amount of sodium sulfate is less than 70 wt %, the cemented carbide scrap is not allowed to react therewith completely, and uncollected tungsten increases significantly. Further, when the amount of sodium sulfate is more than 150 wt %, most of used sodium sulfate remains unreacted, which increases the cost of a chemical (raw material for the molten salt).

Further, in order to decrease the melting point of the molten salt and enhance the flowability thereof, sodium hydroxide or sodium carbonate may be added to the molten salt. The addition amount of sodium hydroxide or sodium carbonate in this case is about from 0 wt % to 40 wt % at maximum with respect to the cemented carbide scrap to be allowed to react. The reason for this is that, when sodium hydroxide or sodium carbonate is added in an amount of 40 wt % or more, the melting point of the molten salt increases. Further, sodium hydroxide or sodium carbonate hardly contributes to the reaction with the cemented carbide scrap, and hence when the addition amount thereof increases, the reactivity of the molten salt decreases, with the result that the cost of a chemical increases.

It should be noted that the melting furnace is desirably a rotary furnace in order to facilitate the stirring of the molten salt. However, the melting furnace is not necessarily limited thereto, and a crucible or the like may be used.

(Molten Salt Dissolution)

Next, the melting furnace into which the above-mentioned raw materials are loaded is heated to generate a molten salt of sodium sulfate, and the cemented carbide scrap is allowed to react with the molten salt to be dissolved in the molten salt (S2 of FIG. 1).

Specifically, the molten salt of sodium sulfate and WC in the cemented carbide scrap are allowed to react with each other to generate a molten salt of sodium tungstate.

It is desired to stir the molten salt during the reaction, and in this respect, the rotary melting furnace is preferably used. The treatment temperature is preferably 900° C. or more and 1,100° C. or less, more preferably 900° C. or more and 1,000° C. or less. The reason for this is that, when the treatment temperature is less than 900° C., the reaction between the molten salt and the cemented carbide scrap does not proceed, and unreacted cemented carbide scrap remains. Further, when the treatment temperature is more than 1,100° C., such temperature is close to the boiling point of tungsten oxide, which leads to a loss of tungsten. Specifically, tungsten oxide is generated through the reaction represented by Equation 5 or the like. In this case, although tungsten oxide is generated even in the case where the treatment temperature is 1,100° C. or less, the generated tungsten oxide is converted to sodium tungstate through the reaction represented by Equation 6 or the like. However, in the case where the treatment temperature is more than 1,100° C., part of tungsten oxide sublimes and is discharged from the furnace before the reaction represented by Equation 6 occurs.

$$WC + Na_2SO_4 \rightarrow WO_3 + Na_2S + CO\uparrow \quad \text{(Equation 5)}$$

$$WO_3 + Na_2SO_4 \rightarrow Na_2WO_4 + SO_2 + \tfrac{1}{2}O_2 \quad \text{(Equation 6)}$$

Therefore, it is desired that the treatment temperature be set to 1,100° C. or less.

It should be noted that, as described above, the reaction between the molten salt of sodium sulfate and the cemented carbide scrap is gentle as compared to the reaction between sodium nitrate and the cemented carbide scrap, and hence it is not necessary to control the reaction by adjusting the supply amount of a chemical, discharge an exhaust gas generated during the reaction outside the furnace in order to remove heat, keep a suitable furnace temperature by cooling the furnace, and the like as in the case of using sodium nitrate.

(Addition of Metal Oxide)

Next, a metal oxide is added to the molten salt (S3 of FIG. 1)

The added metal oxide becomes an insoluble sulfide, such as iron sulfide in the case of iron oxide or cobalt sulfide in the case of cobalt oxide, and thus decomposes and immobilizes the water-soluble sulfide.

There is no particular limitation on the kind of the metal oxide to be added as long as the metal oxide is a transition metal compound containing oxygen, and examples thereof include: transition metal oxides, such as iron oxide, tungsten oxide, and cobalt oxide; transition metal compounds, such as cobalt tungstate; and composite oxides containing the transition metal oxides and the transition metal compounds.

Of those, cobalt oxide or cobalt tungstate is particularly suitable as the metal oxide. The reason for this is that the cemented carbide scrap contains about 7 wt % to 15 wt % of cobalt.

That is, when the cemented carbide scrap is dissolved in the molten salt to generate sodium tungstate, and sodium tungstate thus generated is subjected to solid-liquid separation by being dissolved in water as described later, an insoluble residue (cobalt residue) containing cobalt as a main component is generated. When the water-soluble sulfide is immobilized in this invention, the transition metal sulfide salt generated through the reaction represented by Equation 4 is contained in the cobalt residue because the transition metal sulfide salt is insoluble in water.

The cobalt residue contains cobalt in a concentration of 50 wt % or more and can be considered as a valuable resource. In this case, when a transition metal oxide of Fe, Ni, or the like is used for the decomposition and immobilization treatment of the water-soluble sulfide and a large amount of a transition metal other than cobalt is mixed in the cobalt residue, it becomes difficult to isolate cobalt, with the result that the resource value of the cobalt residue is significantly degraded. However, the degradation of the value of the cobalt residue can be prevented by using cobalt oxide or cobalt tungstate as an immobilizing agent for sulfur.

Further, cobalt sulfide contained in the cobalt residue can be converted into cobalt oxide by being roasted in a rotary kiln or the like and can be used again as an additive (metal oxide) for immobilizing sulfur. Thus, in the case of using cobalt oxide as the immobilizing agent for the water-soluble sulfide, the treatment can be repeatedly continued without newly purchasing an additive.

Therefore, the metal oxide is preferably cobalt oxide.

It should be noted that, also in the case of using a metal oxide other than cobalt oxide, the generated insoluble sulfide can be used after being roasted.

It should be noted that $WO_3$ or cobalt tungstate is also obtained by roasting a cemented carbide tool or ground sludge to be generated in a manufacturing step of the cemented carbide tool and may also be used as the oxide for immobilizing sulfur.

Further, it is preferred that the metal oxide be added after the dissolution, that is, after the cemented carbide scrap is allowed to react with the molten salt completely to be dissolved therein. The reason for this is that, when the metal oxide is added from the beginning of the reaction, the flowability of the molten salt is reduced, with the result that it may be difficult to stir the molten salt during the reaction.

It should be noted that, if there are no problems in the flowability of the molten salt, it is not necessarily required that the timing of the addition of the metal oxide be after the dissolution, and the metal oxide may also be mixed before the dissolution, for example, at the time of loading of the raw materials (at the time of S1).

It should be noted that it is not necessary to supply an oxygen source during the above-mentioned generation reaction of sodium tungstate and the immobilization reaction of the water-soluble sulfide by air bubbling or the like, and hence a burden on a treatment facility of $SO_x$ or the like (see Equation 1), which is an exhaust gas to be generated, can be alleviated.

Further, the molten salt of sodium sulfate has an oxidation power lower than that of the molten salt of sodium nitrate, and chromium added to the cemented carbide scrap as a carbide is not oxidized to harmful hexavalent chromium (oxidation number is less than a valence of 6). This is also apparent from the free energies of the reactions represented by Equation 7 and Equation 8 shown below. In Equation 8 using sodium nitrate, chromium is oxidized up to a valence of 6 to generate water-soluble $Na_2CrO_4$. On the other hand, in Equation 7 using sodium sulfate, chromium becomes trivalent $Na_2Cr_2O_4$ and is hydrolyzed with water. The resultant is contained in the cobalt residue as insoluble $Cr_2O_3$ and separated from tungsten.

In the case of sodium sulfate:

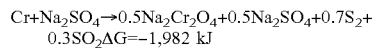

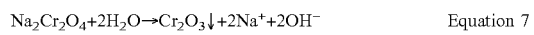     Equation 7

In the case of sodium nitrate:

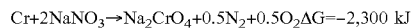

     Equation 8

Further, similarly to chromium, vanadium added to the cemented carbide scrap as a carbide becomes trivalent ion species and is mixed in the aqueous solution. Vanadium may be removed together with phosphorus by a coprecipitation operation of removing phosphorus with magnesium hydroxide, which is a known method.

It should be noted that the amount of the metal oxide to be added is preferably 10 wt % or more and less than 30 wt %, more preferably 10 wt % or more and less than 20 wt % with respect to the weight of the cemented carbide scrap to be allowed to react with the molten salt.

The reason for the foregoing is that, when the amount of the metal oxide to be added is less than 10 wt %, the generation of the water-soluble sulfide becomes conspicuous.

Further, when the amount of the metal oxide to be added is 30 wt % or more, the flowability of the molten salt is reduced, and trouble is caused in which the discharge of the molten salt becomes difficult. That is, it is necessary to dissolve the generated molten salt in water in order to separate sodium tungstate, and when the molten salt cannot be discharged from the furnace, it becomes difficult to dissolve the molten salt in water, which poses a problem for the production.

(Separation of Product)

Next, generated sodium tungstate and the immobilized sulfide are separated from each other (S4 of FIG. 1).

As a method for the separation, there is given a method involving dissolving the molten salt in water to generate the aqueous solution of sodium tungstate.

When the molten salt is dissolved in water, the molten salt may be directly loaded into water or may be dissolved in water after being cooled.

In this case, as water insoluble components in components of the molten salt, there is given, an oxide or sulfide of tantalum, niobium, chromium, titanium, nickel, iron, cobalt, or the like.

Those water-insoluble components may be separated from sodium tungstate in a known filtering process such as filter press.

It should be noted that 50% to 80% of the insoluble components is cobalt sulfide and can be converted to cobalt oxide by being roasted in a rotary kiln or the like. This cobalt oxide can be used again as the metal oxide to be added to the molten salt as described above.

Therefore, the cobalt residue (CoS) may be separated (S5 of FIG. 1) at the time of separation of the sulfide and roasted to obtain cobalt oxide (S6 of FIG. 1), and the cobalt oxide may be added to the molten salt (S3 of FIG. 1).

The method of producing sodium tungstate of this invention is as described above.

Thus, according to the embodiment of this invention, the cemented carbide scrap containing tungsten is allowed to react with the molten salt containing sodium sulfate and having added thereto a metal oxide, to thereby obtain sodium tungstate.

Therefore, the cemented carbide scrap can be allowed to react with the molten salt more efficiently than in the related art, and the generation of harmful byproducts can be suppressed.

EXAMPLES

This invention is specifically described below with reference to Examples.

Example 1

Cemented carbide scrap and sodium sulfate were allowed to react with each other in various blending ratios, and the reactivity of the cemented carbide scrap was evaluated. The specific procedure is as described below.

First, 500 g of cemented carbide scrap and 0 g to 750 g of sodium sulfate were loaded into a magnetic crucible (alumina: 99%, cylindrical shape, ϕ90 mm×120 mm) manufactured by AS ONE Corporation and subjected to dissolution treatment by being held at 1,000° C. for 5 hours. Thus, the cemented carbide scrap and sodium sulfate were allowed to react with each other. It should be noted that, unless otherwise stated in Examples described below, scrap of a cemented carbide tool having a composition of 90 wt % of WC, 9 wt % Co, 0.5 wt % of $Cr_3C_2$, and 0.5 wt % of the others was used as the cemented carbide scrap.

After it was confirmed that the loaded cemented carbide scrap was completely dissolved, 100 g of cobalt oxide was added to the resultant, and the dissolved substance was stirred for several seconds. Then, the resultant was held for 15 minutes.

The dissolution treatment was performed without stirring. The collected dissolved substance was cooled and dissolved in 5 L of pure water. The amount of obtained sodium tungstate was calculated based on the concentration of tungsten in the aqueous solution. The concentration of tungsten was measured by ICP-AES. The specific procedure is as described below.

1. 0.1 ml of a sample is measured and diluted to 100 ml with pure water.
2. Standard solutions containing 10 $mg/dm^3$, 100 $mg/dm^3$, and 200 $mg/dm^3$ of tungsten are used and the emission intensities at the respective concentrations are measured.
3. The emission intensity of the sample is measured.
4. The concentration of tungsten in the sample is determined based on a calibration curve.

Figure 2:
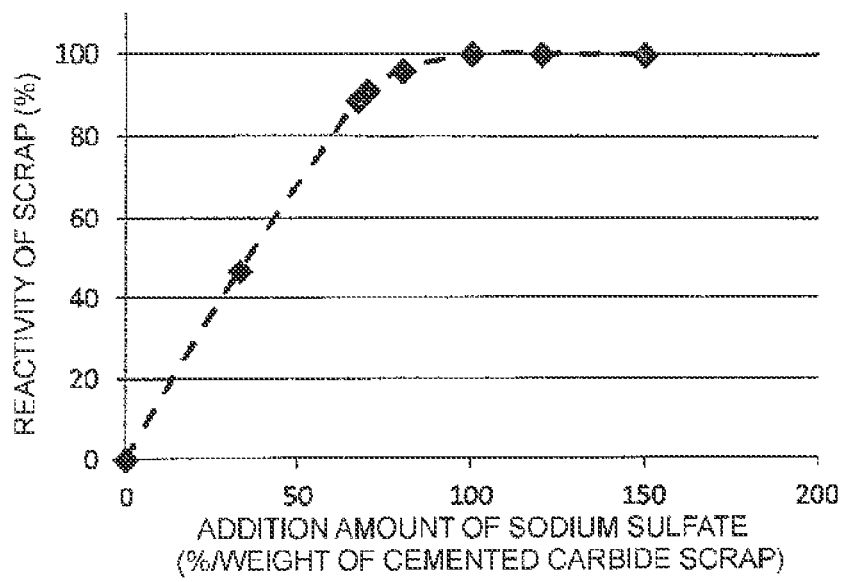
FIG. 2 is a graph obtained from Table 1.

The relationship between the reactivity of the cemented carbide scrap, which is calculated based on an unreacted product after the dissolution treatment and the concentration of tungsten in the aqueous solution, and the addition amount of sodium sulfate is shown in FIG. 2 and Table 1. It should be noted that the reactivity of scrap refers to a ratio of the weight of tungsten which reacts with the molten salt to become sodium tungstate with respect to the weight of tungsten which is supplied as the cemented carbide scrap.

TABLE 1

|  | Weight of scrap | Use amount of sodium nitrate (%/weight of cemented carbide scrap) | Reactivity of scrap (%) |
| --- | --- | --- | --- |
| Comparative Example | 500 g | 0 wt % | 0% |
|  | 500 g | 33 wt % | 46.70% |
|  | 500 g | 67 wt % | 88.80% |
| This invention | 500 g | 70 wt % | 91.10% |
|  | 500 g | 80 wt % | 96.00% |
|  | 500 g | 100 wt % | 100% |
|  | 500 g | 120 wt % | 100% |
|  | 500 g | 150 wt % | 100% |

As is apparent from FIG. 2 and Table 1, as the amount of sodium sulfate with respect to the cemented carbide scrap decreased, a larger amount of the cemented carbide scrap remained unreacted, and the recovery ratio of tungsten decreased more.

On the other hand, as the ratio of sodium sulfate increased, the reactivity of the scrap increased more, and 90% or more of the cemented carbide scrap reacted when the ratio of sodium sulfate was 70 wt %.

Further, the reactivity reached 100% when the ratio of sodium sulfate was 100 wt %, and the cemented carbide scrap completely reacted.

From the above-mentioned results, it was found that it was necessary to add sodium sulfate substantially in the same weight as that of the cemented carbide scrap in order to allow the cemented carbide scrap to react completely.

Further, although the reactivity of the cemented carbide scrap is not changed even when sodium sulfate is added in a ratio of 100% or more, the consumption amount of sodium sulfate increases.

Therefore, it was found that the optimum use amount of sodium sulfate was preferably 70 wt % or more and 150 wt % or less, more preferably 70 wt % or more and 100 wt % or less with respect to the cemented carbide scrap.

Example 2

Next, various metal additives were added in various ratios, and the ability to immobilize a sulfide and the flowability of a molten salt were evaluated. The specific procedure is as described below.

First, the same cemented carbide scrap as that of Example 1 or cemented carbide scrap having a composition of 85 wt % of WC and 15 wt % of Co and sodium sulfate in the same weight as that of the cemented carbide scrap were loaded into a magnetic crucible (alumina: 44%, silica: 46%, dimensions: ϕ69 mm×53 mm) manufactured by AS ONE Corporation and subjected to dissolution treatment at 1,000° C. Thus, the cemented carbide scrap and sodium sulfate were allowed to react with each other.

It should be noted that, regarding the treatment time, it was confirmed in Example 1 that in the case where sodium sulfate was used in a ratio of 100 wt % with respect to the weight of the cemented carbide scrap, the scrap was completely dissolved by the treatment for 2 hours, and hence all the subsequent tests were performed for the treatment time of 2 hours. The dissolution treatment was performed without stirring.

After it was confirmed that the loaded cemented carbide scrap was completely dissolved, various transition metal oxides (in this case, three kinds of cobalt oxide, nickel oxide, and iron oxide) were added, and the dissolved substance was stirred for several seconds, followed by being held for 15 minutes.

Then, the dissolved substance was directly loaded into water at room temperature to generate an aqueous solution of sodium tungstate, and the concentration of sulfide ions contained in the aqueous solution was measured.

The concentration of the sulfide ions was measured by a method of quantifying sulfide ions (Method3761) specified by United States Environmental Protection Agency (EPA). The specific procedure is as described below.

1. A known amount of a 0.025 N aqueous solution of iodine is supplied to a 500 ml flask.
2. Distilled water is added to the flask to set the amount of the aqueous solution to about 20 ml.
3. 2 ml of a 6 N aqueous solution of hydrogen chloride is added to the flask.
4. 200 ml of a sample is added to the flask.
5. In the case where the color of iodine disappears, the aqueous solution of iodine is added to the flask.
6. Titration is performed with a 0.025 N aqueous solution of sodium thiosulfate.
7. When the color of iodine becomes pale, a starch indicator is added so as to develop a blue color.
8. The concentration of sulfide ions in the aqueous solution is determined based on the amount of the aqueous solution of sodium thiosulfate required for the blue color developed through the reaction between iodine and starch to disappear.

In the case where the amount of the iodine solution used in the above-mentioned operation was defined as A (ml), and the amount of the aqueous solution of sodium thiosulfate used in the above-mentioned operation was defined as B (ml), the concentration of the sulfide ions in the aqueous solution was determined by the following equation.

Concentration of sulfide ions (mg/L)=400×(A−B)/ Use amount of sample (ml)

Next, the concentration of tungsten was measured by ICP-AES, and the mixing ratio S/W (%) of the sulfide ions in the aqueous solution of sodium tungstate was determined by the following equation.

S/W (%)=Concentration of sulfide ions (g/L)/Concentration of tungsten (g/L)×100

The mixing ratio (%) of the sulfide ions in the aqueous solution of sodium tungstate is hereinafter represented as S/W (%).

Figure 3:
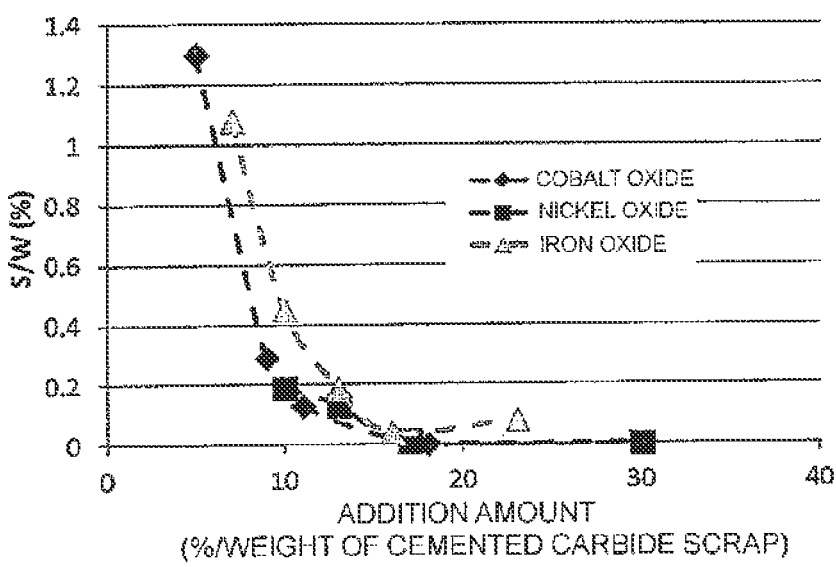
FIG. 3 is a graph obtained from Table 2.

The results are shown in FIG. 3 and Table 2. It should be noted that, in "Flowability of molten salt" in Table 2, "symbol ○" represents the case where the molten salt can be taken out merely by tilting the crucible, and "symbol Δ" represents the case where the molten salt cannot be taken out without placing the crucible upside down and a solid content remains in the crucible.

TABLE 2

|  | Weight of scrap (g) | Use amount of sodium sulfate (%/weight of cemented carbide scrap) | Content of Co in scrap (wt %) | Amount of additive (%/weight of cemented carbide scrap) | Additive | S/W (%) | Flowability of molten salt |
|---|---|---|---|---|---|---|---|
| Comparative Example | 46.7 | 100 wt % | 9 wt % | 0 wt % | — | 6.73 | ○ |
|  | 34.6 | 100 wt % | 9 wt % | 5 wt % | Cobalt oxide | 1.3 | ○ |
|  | 34.6 | 100 wt % | 9 wt % | 9 wt % |  | 0.29 | ○ |
|  | 34.6 | 100 wt % | 15 wt % | 0 wt % |  | 1.31 | ○ |
|  | 34.6 | 100 wt % | 15 wt % | 4 wt % |  | 0.21 | ○ |
| This invention | 34.6 | 100 wt % | 15 wt % | 5 wt % |  | 0.11 | ○ |
|  | 34.6 | 100 wt % | 9 wt % | 10 wt % |  | 0.13 | ○ |
|  | 34.6 | 100 wt % | 9 wt % | 18 wt % |  | 0 | ○ |
|  | 34.6 | 100 wt % | 9 wt % | 30 wt % |  | 0 | Δ |
|  | 34.6 | 100 wt % | 9 wt % | 10 wt % | Nickel oxide | 0.19 | ○ |
|  | 34.6 | 100 wt % | 9 wt % | 13 wt % |  | 0.13 | ○ |
|  | 34.6 | 100 wt % | 9 wt % | 17 wt % |  | 0.01 | ○ |
|  | 34.6 | 100 wt % | 9 wt % | 30 wt % |  | 0 | Δ |
| Comparative Example | 44 | 100 wt % | 9 wt % | 7 wt % | Iron oxide | 1.08 | ○ |
|  | 44 | 100 wt % | 9 wt % | 9 wt % |  | 0.45 | ○ |
| This invention | 44 | 100 wt % | 9 wt % | 11 wt % |  | 0.19 | ○ |
|  | 44 | 100 wt % | 9 wt % | 16 wt % |  | 0.04 | ○ |
|  | 44 | 100 wt % | 9 wt % | 23 wt % |  | 0.08 | ○ |

As is apparent from FIG. 3 and Table 2, all the oxides were able to immobilize the water-soluble sulfide. However, cobalt oxide and nickel oxide had higher ability to immobilize the water-soluble sulfide than iron oxide and allowed almost complete immobilization of the water-soluble sulfide generated in the molten salt (that is, the S/W became 0%). The amount of the transition metal oxide required for immobilizing the water-soluble sulfide was varied depending on the content of cobalt in the cemented carbide scrap, and it was necessary to add at least 5 wt % or more of the transition metal oxide. Further, when the addition amount of the transition metal oxide was increased, the immobilization of the water-soluble sulfide proceeded. However, when the transition metal oxide was added in an amount of 30% or more in terms of a ratio to the weight of the cemented carbide scrap, the flowability of the molten salt dissolved substance was reduced.

Figure 4:
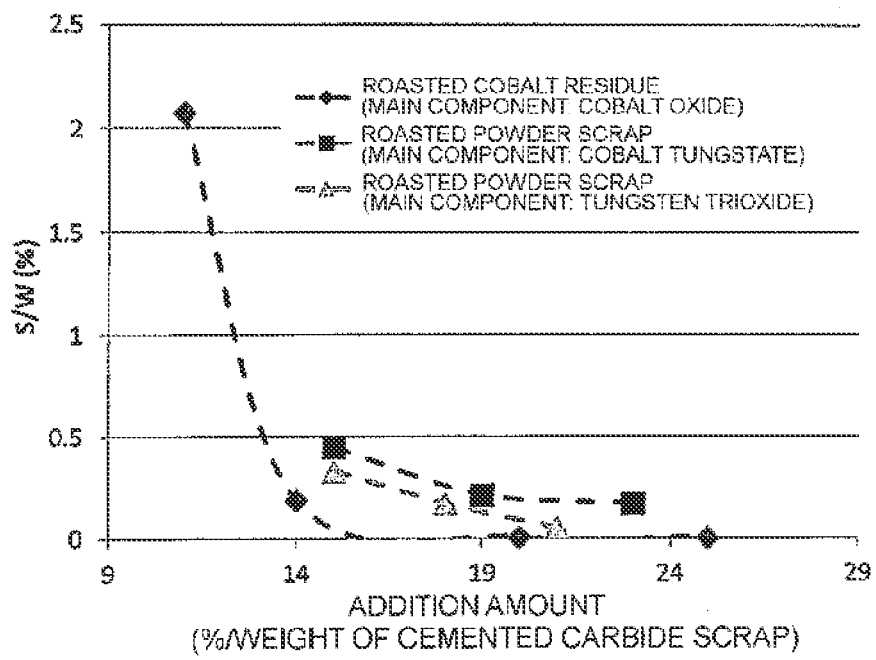
FIG. 4 is a graph obtained from Table 3.

Further, the same evaluation was also performed with respect to the case of adding powder obtained by roasting a residue containing cobalt as a main component which was generated when the cemented carbide scrap was treated with the molten salt of sodium sulfate. The results are shown in FIG. 4 and Table 3.

TABLE 3

| | Weight of scrap (g) | Content of Co in scrap | Use amount of sodium sulfate (%/weight of cemented carbide scrap) | Amount of additive (%/weight of cemented carbide scrap) | Additive | S/W (%) | Flowability of molten salt |
|---|---|---|---|---|---|---|---|
| Comparative Example | 34.6 | 9 wt % | 100 wt % | 11 wt % | *1 | 2.08 | ○ |
| This invention | 47.7 | 9 wt % | 100 wt % | 14 wt % | | 0.19 | ○ |
| | 34.7 | 9 wt % | 100 wt % | 20 wt % | | 0 | ○ |
| | 47.2 | 9 wt % | 100 wt % | 25 wt % | | 0 | Δ |
| Comparative Example | 60.6 | 15 wt % | 100 wt % | 0 wt % | | 1.31 | ○ |
| | 60.6 | 15 wt % | 100 wt % | 8 wt % | | 0.21 | ○ |
| This invention | 60.4 | 15 wt % | 100 wt % | 9 wt % | | 0.1 | ○ |
| Comparative Example | 47.1 | 9 wt % | 100 wt % | 13 wt % | *2 | 0.45 | ○ |
| This invention | 47.1 | 9 wt % | 100 wt % | 19 wt % | | 0.2 | ○ |
| | 47.1 | 9 wt % | 100 wt % | 23 wt % | | 0.17 | Δ |
| Comparative Example | 47.1 | 9 wt % | 100 wt % | 13 wt % | *3 | 0.33 | ○ |
| This invention | 47.1 | 9 wt % | 100 wt % | 18 wt % | | 0.17 | ○ |
| | 47.2 | 9 wt % | 100 wt % | 21 wt % | | 0.05 | Δ |

*1 Roasted cobalt residue (main component: cobalt oxide)
*2 Roasted powder scrap (main component: cobalt tungstate)
*3 Roasted powder scrap (main component: tungsten trioxide)

As is apparent from FIG. 4 and Table 3, although the S/W was high and a decrease in efficiency of immobilization was observed, as compared to pure cobalt oxide, it was confirmed that the S/W, which was a ratio of sulfur with respect to tungsten, was less than 0.2% with the addition of 14% or more of the roasted powder. The optimum addition amount of the roasted cobalt residue was varied depending on the weight of cobalt contained in the cemented carbide scrap, and in the case of scrap containing cobalt in a very large content of 15 wt %, the S/W was less than 0.2% with the addition of 9 wt % of the roasted cobalt residue. Even when cobalt oxide or the roasted cobalt residue was added in an amount of 20% or more, there was no significance difference in S/W. Such immobilization treatment of the water-soluble sulfide was also achieved with cobalt tungstate or $WO_3$.

From the above-mentioned results, it was found that the optimum addition amount of the transition metal oxide was preferably 5 wt % or more and less than 30 wt %, more preferably 5 wt % or more and less than 20 wt % with respect to the cemented carbide scrap, although varied slightly depending on the kind of the additive and the content of cobalt in the cemented carbide scrap.

Example 3

Cemented carbide scrap and sodium sulfate in the same weight as that of the cemented carbide scrap were loaded into the same magnetic crucible as that of Example 2, and the case of adding iron oxide serving as a metal oxide before the treatment (before the dissolution) and the case of adding iron oxide serving as a metal oxide after the generation of a molten salt of sodium tungstate (after the dissolution) were compared to each other. It should be noted that other conditions were the same as those of Example 2.

Figure 5:
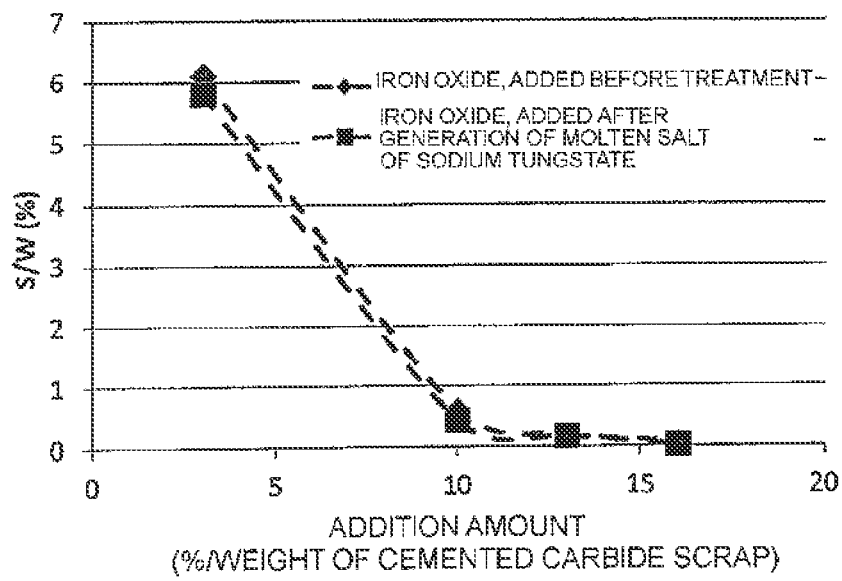
FIG. 5 is a graph obtained from Table 4.

The results are shown in FIG. 5 and Table 4.

TABLE 4

| | Weight of scrap | Use amount of sodium sulfate (%/weight of cemented carbide scrap) | Amount of additive (%/weight of cemented carbide scrap) | S/W (%) |
|---|---|---|---|---|
| Comparative Example | 44.1 g | 100 wt % | 3 wt % (iron oxide, added before treatment) | 6.1 |
| This invention | 44.1 g | 100 wt % | 9 wt % (iron oxide, added before treatment) | 0.61 |
| | 44.0 g | 100 wt % | 13 wt % (iron oxide, added before treatment) | 0.2 |
| | 44.0 g | 100 wt % | 16 wt % (iron oxide, added before treatment) | 0.07 |
| Comparative Example | 44.1 g | 100 wt % | 3 wt % (iron oxide, added after generation of molten salt of sodium tungstate) | 5.8 |
| | 44.2 g | 100 wt % | 9 wt % (iron oxide, added after generation of molten salt of sodium tungstate) | 0.45 |

TABLE 4-continued

|  | Weight of scrap | Use amount of sodium sulfate (%/weight of cemented carbide scrap) | Amount of additive (%/weight of cemented carbide scrap) | S/W (%) |
|---|---|---|---|---|
| This invention | 44.2 g | 100 wt % | 13 wt % (iron oxide, added after generation of molten salt of sodium tungstate) | 0.19 |
|  | 44.1 g | 100 wt % | 16 wt % (iron oxide, added after generation of molten salt of sodium tungstate) | 0.04 |

As is apparent from FIG. 5 and Table 4, there was no significant difference in S/W depending on whether iron oxide was loaded before or after the generation of the molten salt.

Therefore, it was found that the immobilization reaction of the water-soluble sulfide was not significantly varied depending on the timing of adding iron oxide (whether iron oxide was loaded before or after the generation of the molten salt).

Example 4

Cemented carbide scrap and sodium sulfate were allowed to react with each other by performing dissolution at various temperatures, and the reactivity of the scrap was evaluated. The specific procedure is as described below.

First, 44.1 g of cemented carbide scrap having the same composition as that of Example 1 and sodium sulfate in the same weight as that of the cemented carbide scrap were loaded into a magnetic crucible and subjected to dissolution treatment at from 800° C. to 1,100° C. for 2 hours. The dissolution treatment was performed without stirring.

Then, the generated molten salt was collected, and the reactivity of the cemented carbide scrap was investigated. The results are shown in FIG. 6 and Table 5.

TABLE 5

|  | Weight of scrap | Treatment temperature | Reactivity of scrap | Remarks |
|---|---|---|---|---|
| Comparative Example | 500 g | 800° C. | 2.50% |  |
|  | 500 g | 850° C. | 42% |  |
| This invention | 500 g | 900° C. | 96% |  |
|  | 500 g | 950° C. | 100% |  |
|  | 500 g | 1,000° C. | 100% |  |
|  | 500 g | 1,100° C. | 100% | Adhesion of WO₃ |

Figure 6:
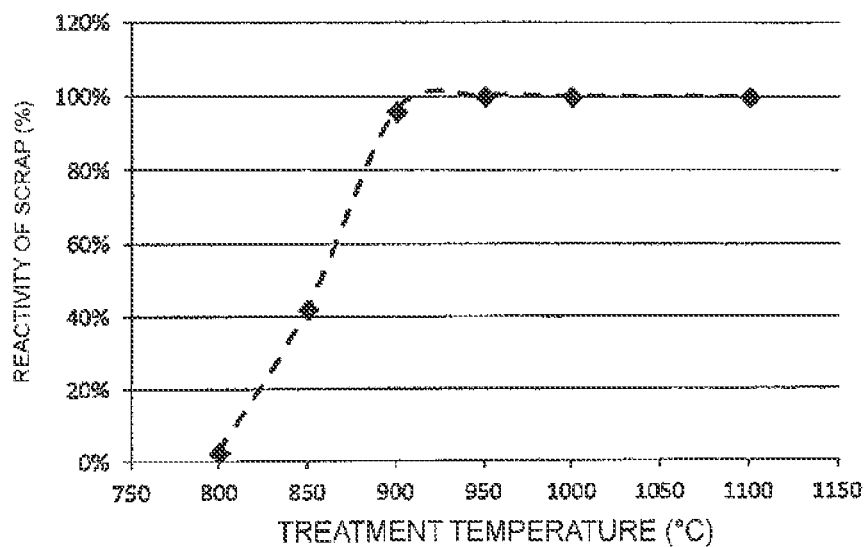
FIG. 6 is a graph obtained from Table 5.

As is apparent from FIG. 6 and Table 5, the reaction hardly proceeded at 800° C., and it was found that it was necessary to set the temperature to 900° C. or more in order to convert the cemented carbide scrap into the molten salt of sodium tungstate with the molten salt of sodium sulfate.

It should be noted that, in the case where the treatment was performed at 1,100° C., the reactivity was 100%, but the adhesion of tungsten oxide to the periphery of a reactor was confirmed. The reason for this is considered as follows: the boiling point of tungsten oxide was relatively low, and hence $WO_3$ was volatilized through the treatment at high temperature and solidified. That is, it is considered that although the boiling point of $WO_3$ was about 1,840° C., $WO_3$ started subliming at from 1,100° C. to 1,400° C., and hence volatilized $WO_3$ was solidified.

Example 5

The time for immobilizing sulfur was evaluated both in the case of stirring a molten salt after the addition of a metal oxide and in the case of not stirring the molten salt. The specific procedure is as described below.

Cemented carbide scrap having the same composition as that of Example 1 and sodium sulfate in the same weight as that of the cemented carbide scrap were loaded into a magnetic crucible and subjected to dissolution treatment at 1,000° C. for 2 hours. Thus, the cemented carbide scrap and sodium sulfate were allowed to react with each other. The dissolution treatment was performed without stirring.

Next, after it was confirmed that the loaded cemented carbide scrap was completely dissolved, cobalt oxide was added to the resultant in an amount of 11% with respect to the weight of the cemented carbide scrap. Then, stirring was performed in some of the samples for several seconds, and stirring was not performed in some of the samples.

Figure 7:
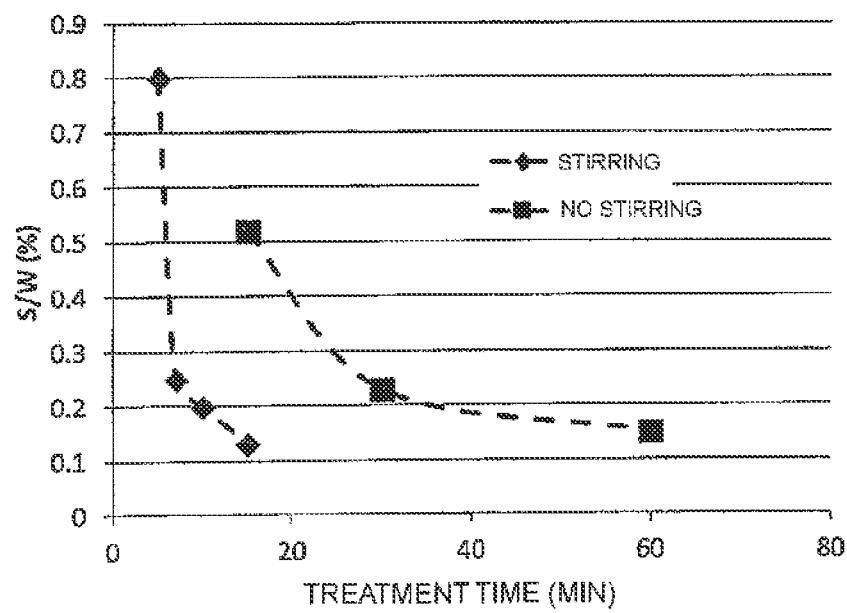
FIG. 7 is a graph obtained from Table 6.

The dissolved substance after the treatment was directly loaded into water at room temperature, and the concentration of sulfide ions contained in the aqueous solution was measured. The results are shown in FIG. 7 and Table 6. It should be noted that the time for immobilizing sulfur of FIG. 7 and Table 6 refers to a period of time required for immobilizing the water-soluble sulfide after the addition of cobalt oxide. Specifically, the time for immobilizing sulfur refers to a period of time for holding the dissolved substance at 1,000° C. after the loading of cobalt oxide before the direct loading into water.

TABLE 6

|  | Weight of scrap | Presence or absence of stirring | Time for immobilizing sulfur | S/W (%) |
|---|---|---|---|---|
| This invention | 44.1 g | Present | 5 | 0.8 |
|  | 44.1 g | Present | 7 | 0.25 |
|  | 44.1 g | Present | 10 | 0.2 |
|  | 44.1 g | Present | 15 | 0.13 |
|  | 44.1 g | Absent | 15 | 0.52 |
|  | 44.1 g | Absent | 30 | 0.23 |
|  | 44.1 g | Absent | 60 | 0.15 |

As shown in Table 6, it was found that when stirring was performed after the addition of cobalt oxide, the immobilization of the water-soluble sulfide proceeded promptly, as compared to the case of not performing stirring.

INDUSTRIAL APPLICABILITY

While this invention has been described above with reference to the embodiments and Examples, this invention is not limited to the above-mentioned embodiments.

It should be understood that a person skilled in the art could arrive at various modification examples and improvement examples within the scope of this invention, and that those modification examples and improvement examples are encompassed in the scope of this invention.

The invention claimed is:

1. A method of producing sodium tungstate, the method comprising allowing cemented carbide scrap containing tungsten to react with a molten salt containing sodium sulfate and having added thereto a metal oxide, to thereby obtain sodium tungstate.

2. The method of producing sodium tungstate according to claim 1, the method comprising:
   (a) generating a molten salt of sodium tungstate through a reaction between sodium sulfate in the molten salt containing the sodium sulfate and tungsten carbide in the cemented carbide scrap; and
   (b) immobilizing a sulfide ion to be generated during the reaction between the sodium sulfate and the tungsten carbide by allowing the sulfide ion to react with the metal oxide.

3. The method of producing sodium tungstate according to claim 2, the method further comprising (c) dissolving the generated sodium tungstate in water to obtain an aqueous solution of sodium tungstate.

4. The method of producing sodium tungstate according to claim 1, wherein the metal oxide is added before or after the generating a molten salt.

5. The method of producing sodium tungstate according to claim 1, wherein the metal oxide is added in an amount of 5 wt % or more and less than 30 wt % with respect to a weight of the cemented carbide scrap.

6. The method of producing sodium tungstate according to claim 1, wherein the metal oxide is added in an amount of 5 wt % or more and less than 20 wt % with respect to a weight of the cemented carbide scrap.

7. The method of producing sodium tungstate according to claim 3, wherein the dissolving comprises dissolving the generated sodium tungstate in water, to thereby obtain an aqueous solution of sodium tungstate having a mixing ratio (%) of a sulfide ion of 0.2% or less.

8. The method of producing sodium tungstate according to claim 1, wherein the sodium sulfate is added in an amount of 70 wt % or more and 150 wt % or less with respect to a weight of the cemented carbide scrap.

9. The method of producing sodium tungstate according to claim 1, wherein the sodium sulfate is added in an amount of 70 wt % or more and 100 wt % or less with respect to a weight of the cemented carbide scrap.

10. The method of producing sodium tungstate according to claim 1, wherein:
    the cemented carbide scrap contains chromium; and
    an oxidation number of the chromium is set to a valence of less than 6 when the sodium tungstate is obtained.

11. The method of producing sodium tungstate according to claim 1, wherein the metal oxide comprises a transition metal oxide.

12. The method of producing sodium tungstate according to claim 1, wherein the metal oxide comprises an oxide containing iron oxide, nickel oxide, cobalt oxide, cobalt tungstate, and tungsten trioxide.

13. The method of producing sodium tungstate according to claim 1, wherein:
    the cemented carbide scrap contains cobalt; and
    the cemented carbide scrap is roasted to obtain cobalt tungstate or tungsten trioxide, and the obtained cobalt tungstate or the obtained tungsten trioxide is used as the metal oxide.

14. The method of producing sodium tungstate according to claim 13, further comprising immobilizing a water-soluble sulfide, which is a byproduct, by adding, as the metal oxide, cobalt tungstate or tungsten trioxide in an amount of 14 wt % or more and less than 20 wt % with respect to a weight of the cemented carbide scrap.

15. The method of producing sodium tungstate according to claim 1, wherein:
    the cemented carbide scrap contains cobalt; and
    the metal oxide is obtained by oxidizing and roasting a residue containing cobalt as a main component, the residue being generated when the sodium tungstate is obtained.

16. The method of producing sodium tungstate according to claim 15, further comprising immobilizing a water-soluble sulfide, which is a byproduct, by adding the metal oxide, which is obtained by oxidizing and roasting the residue containing cobalt as a main component, in an amount of 14 wt % or more and less than 20 wt % with respect to a weight of the cemented carbide scrap.

17. The method of producing sodium tungstate according to claim 2, wherein the reaction is performed at a temperature of 900° C. or more and 1,100° C. or less.

18. The method of producing sodium tungstate according to claim 3, wherein the reaction is performed at a temperature of 900° C. or more and 1,000° C. or less.

19. The method of producing sodium tungstate according to claim 2, wherein the immobilizing comprises immobilizing a sulfide ion to be generated during the reaction between the sodium sulfate and the tungsten by allowing the sulfide ion to react with the metal oxide while stirring the molten salt.

* * * * *